US010054240B2

(12) United States Patent
Thurau

(10) Patent No.: US 10,054,240 B2
(45) Date of Patent: Aug. 21, 2018

(54) VALVE TOP

(71) Applicant: Fluehs Drehtechnik GmbH, Luedenscheid (DE)

(72) Inventor: Friedrich Thurau, Herscheid (DE)

(73) Assignee: Fluehs Drehtechnick GmbH, Luedenscheid (DE)

( * ) Notice: Subject to any disclaimer, the term of this patent is extended or adjusted under 35 U.S.C. 154(b) by 99 days.

(21) Appl. No.: 15/110,491

(22) PCT Filed: Jan. 13, 2015

(86) PCT No.: PCT/EP2015/050511
§ 371 (c)(1),
(2) Date: Jul. 8, 2016

(87) PCT Pub. No.: WO2015/135666
PCT Pub. Date: Sep. 17, 2015

(65) Prior Publication Data
US 2016/0327175 A1  Nov. 10, 2016

(30) Foreign Application Priority Data

Mar. 11, 2014 (DE) .................... 20 2014 101 096 U

(51) Int. Cl.
*F16K 3/08* (2006.01)
*F16K 31/00* (2006.01)
(Continued)

(52) U.S. Cl.
CPC .............. *F16K 31/003* (2013.01); *F16K 3/08* (2013.01); *F16K 3/24* (2013.01); *F16K 21/06* (2013.01); *F16K 31/56* (2013.01); *F16K 31/563* (2013.01)

(58) Field of Classification Search
CPC ........ F16K 31/003; F16K 31/563; F16K 3/24; F16K 3/08; F16K 21/06; F16K 31/56;
(Continued)

(56) References Cited

U.S. PATENT DOCUMENTS 1,511,566 A * 10/1924 Kollock ............... B25D 11/102
173/203
2,096,526 A * 10/1937 Pratt ..................... F02M 26/21
123/568.15
(Continued)

FOREIGN PATENT DOCUMENTS

| DE | 32 07 895 C2 | 12/1983 |
| EP | 0 424 782 A1 | 5/1991 |
| FR | 1141475 A | 9/1957 |

OTHER PUBLICATIONS

International Search Report of PCT/EP2015/050511, dated May 29, 2015.

*Primary Examiner* — Craig J Price
*Assistant Examiner* — Andrew J Rost
(74) *Attorney, Agent, or Firm* — Collard & Roe, P.C.

(57) ABSTRACT

A valve top includes a head piece which is centrally penetrated by a spindle which is rotatably mounted in the head piece around its longitudinal axis and via which a control disk can be rotated relative to an inlet plate abutting the same, wherein a control sleeve having a control contour is arranged within the head piece on the spindle, and a guide sleeve having a guide contour is arranged opposite the control contour, which control sleeve and guide sleeve interact in such a way that after actuation of the control disk via the spindle into a defined direction, an autonomous return movement of the control disk into its starting position is effected.

9 Claims, 9 Drawing Sheets

Figure 1:
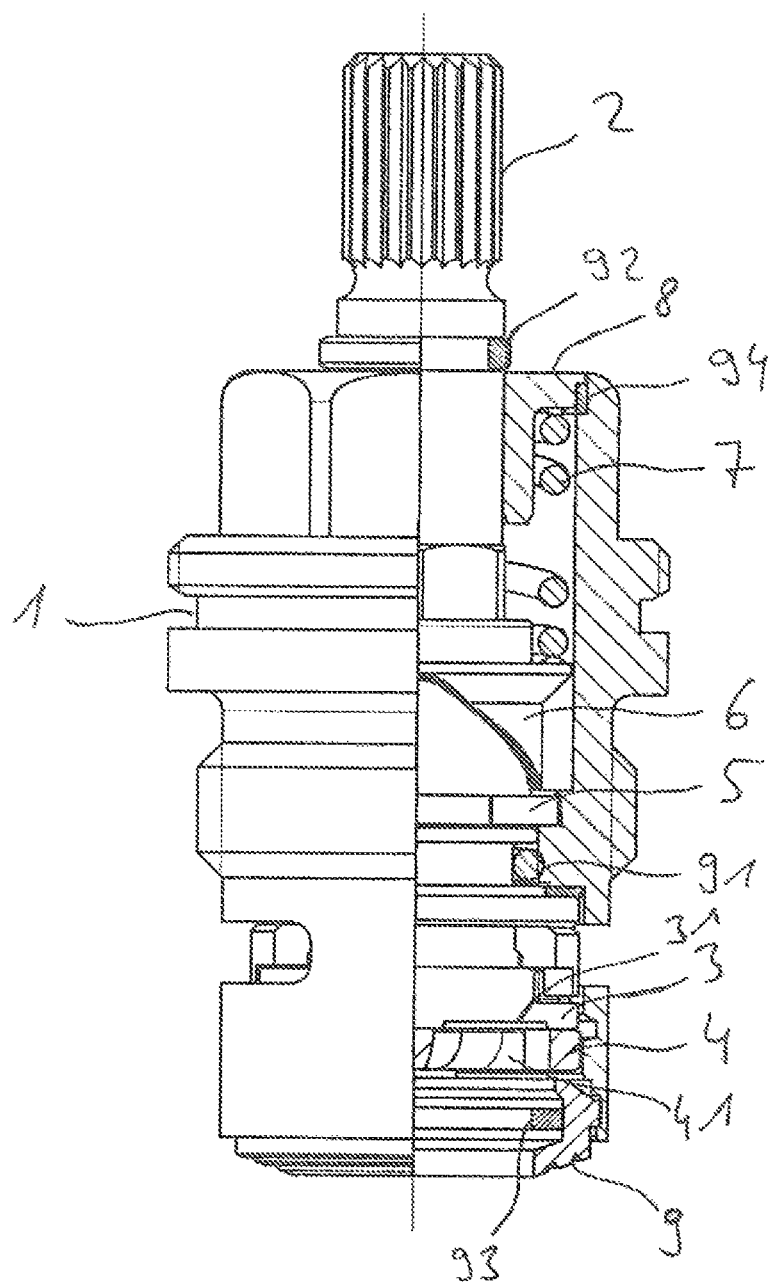

(51) Int. Cl.
*F16K 31/56* (2006.01)
*F16K 3/24* (2006.01)
*F16K 21/06* (2006.01)

(58) Field of Classification Search
CPC ..... Y10T 137/86879; Y10T 137/86743; Y10T 137/6014; Y10T 137/6031
USPC ............... 251/251, 252, 253, 254, 262, 263; 137/625.46, 625.31, 315.12, 315.17
See application file for complete search history.

(56) References Cited

U.S. PATENT DOCUMENTS

| | | | | |
|---|---|---|---|---|
| 2,510,393 | A * | 6/1950 | Fraser | ............... F16K 31/52408 |
| | | | | 251/256 |
| 2,606,450 | A * | 8/1952 | Bolling | ................... F16K 21/04 |
| | | | | 251/255 |
| 3,780,758 | A | 12/1973 | Devries | |
| 4,303,222 | A * | 12/1981 | Campbell | ................. F16K 7/06 |
| | | | | 251/252 |
| 4,343,456 | A * | 8/1982 | Zitzloff | ................... F16K 27/02 |
| | | | | 251/255 |
| 5,014,736 | A * | 5/1991 | Korfgen | .................... F16K 3/08 |
| | | | | 137/315.13 |
| 5,103,857 | A | 4/1992 | Kuhn et al. | |
| 6,860,469 | B2 * | 3/2005 | Kerg | ......................... F16K 7/16 |
| | | | | 251/263 |
| 7,264,016 | B2 * | 9/2007 | Molina | ..................... E03C 1/04 |
| | | | | 137/454.6 |
| 7,607,639 | B2 * | 10/2009 | Chen | ......................... F16K 3/08 |
| | | | | 137/625.31 |
| 8,297,305 | B2 * | 10/2012 | Ritter | ................... E03C 1/0403 |
| | | | | 137/454.2 |

* cited by examiner

Fig. 3
a)
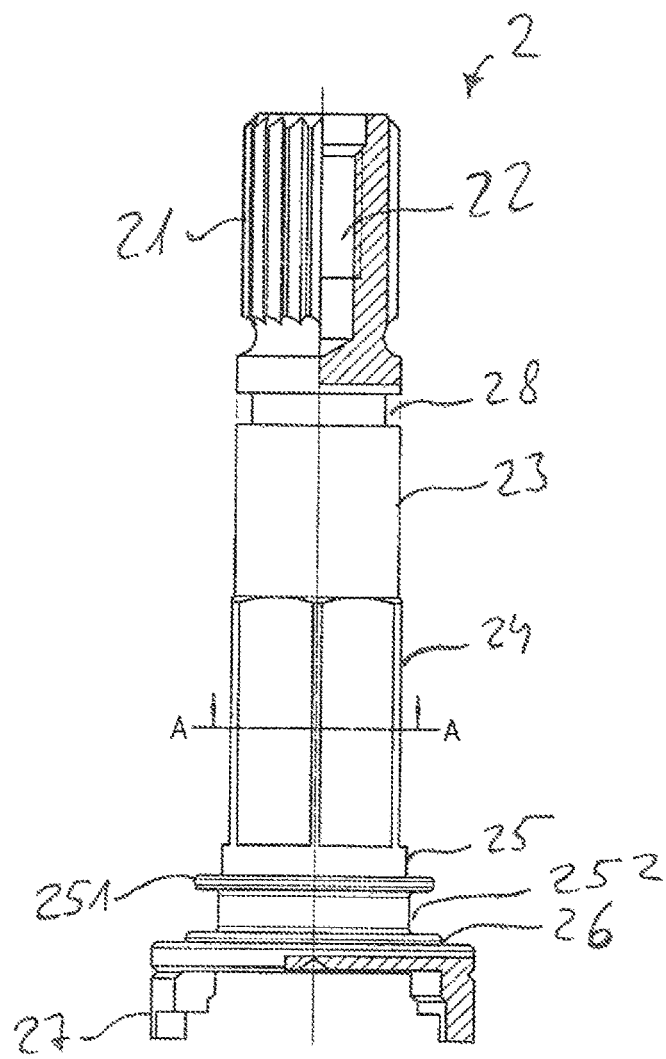
b)
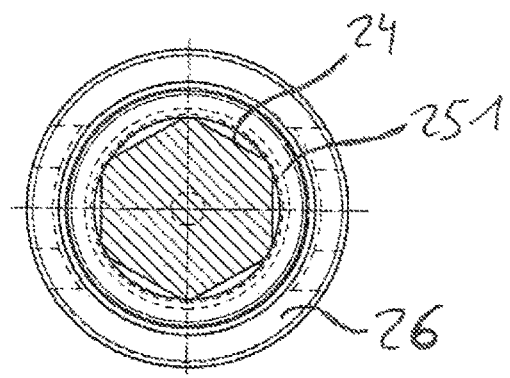
Schnitt A-A
c)
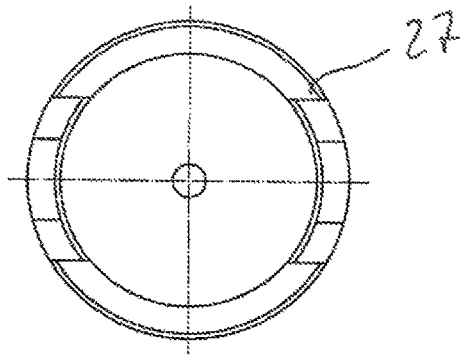

Fig. 8
a) 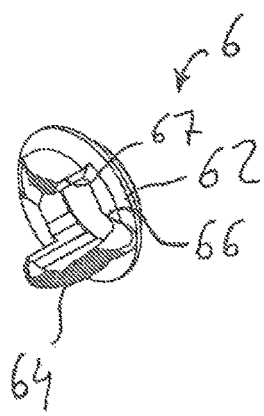
d) 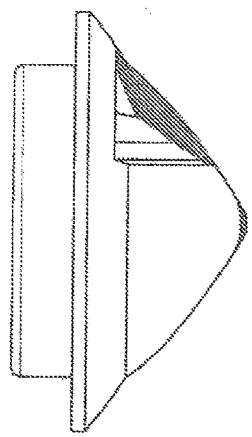
b) 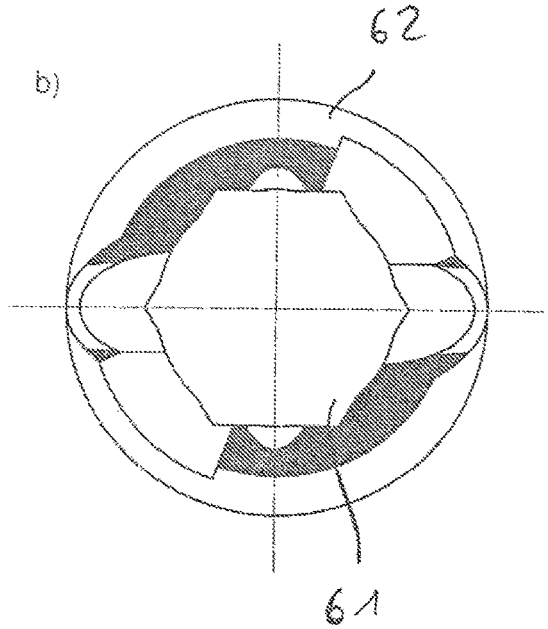
c) 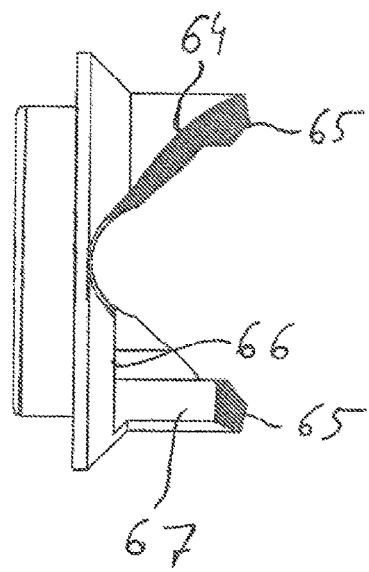

VALVE TOP

CROSS REFERENCE TO RELATED APPLICATIONS

This application is the National Stage of PCT/EP2015/050511 filed on Jan. 13, 2015, which claims priority under 35 U.S.C. § 119 of German Application No. 20 2014 101 096.3 filed on Mar. 11, 2014, the disclosures of which are incorporated by reference. The international application under PCT article 21(2) was not published in English.

The invention relates to valve top having a head piece, through the center of which piece a spindle passes, which spindle is mounted in the head piece so as to rotate about its longitudinal axis, and by way of which spindle a control disk can be rotated relative to an inlet disk that lies against the same.

Exit of media from fittings is controlled using valve tops. For this purpose, the valve top is screwed into the housing of a fitting by means of its head piece. A rotational handle or lever is set onto its spindle. In the case of known valve tops (see DE 32 07 895 C2), two disks are provided, in each instance, for controlling the through-flow. The disks are produced from ceramic material. One of the two disks—control disk—is disposed in the valve top so as to rotate, using a driver that stands in connection with the spindle. The other disk—inlet disk—is a fixed valve seat disk, also referred to as a fixed disk. When the control disk rotates, the disks slide on one another. A seal is disposed on the side that faces the valve seat of the fitting, which seal lies against the inlet disk. The seal projects beyond the face surface of the valve top. It serves to provide a seal not only toward the inlet disk but also toward the valve of the fitting.

Valve tops are also frequently structured as a multi-way valve. In this regard, only one of multiple, particularly of two feed lines is released, in each instance, by the valve body, so that optionally, "only cold water" or "only hot water" can be obtained, for example. Furthermore, a defined "completely closed" position is provided. To reduce the amount of water dispensed, particularly also in the case of dispensing hot water, it is desirable that the valve body is automatically moved back to the "completely closed" position after it has been operated.

This is where the present invention takes its start. The invention is based on the task of making available a valve top that automatically moves to the "completely closed" position after activation of the valve body for withdrawal of a fluid from at least one feed line. According to the invention, this task is accomplished by a valve top having the characteristics of the characterizing part of claim 1.

With the invention, a valve top is created, which, after activation of, the valve body for withdrawal of a fluid from at least one feed line, automatically moves to the "completely closed" position. Automatic return movement of the control disk into the closed valve position (starting position) is achieved by means of the interplay of control sleeve and guide sleeve. A simple exchange of individual functions is made possible by means of the arrangement of two sleeves disposed on the spindle. In this regard, one sleeve can be easily replaced in the event of a defect, on the one hand. Furthermore, implementation of a different function is also made possible by means of the use of different types of control sleeves and guide sleeves. Preferably, the guide sleeve is held in the head piece in torque-proof manner.

In an embodiment of the invention, the control sleeve has a non-round, particularly multi-sided or also polygonal axial passage, through which a non-round, particularly multi-sided or also polygonal segment disposed on the spindle passes. In this regard, the control sleeve is biased against the guide sleeve, preferably by way of a spring element, preferably a helical spring. In this way, continuous contact between control sleeve and control contour of the head piece is achieved. For example, the spring element can also be configured in the form of an elastomer element.

In a further embodiment of the invention, the control sleeve has a radially circumferential contact surface against which the spring element lies. In this way, an accommodation for the spring element, structured as a function of the head piece, is achieved.

In a further embodiment of the invention, the head piece is closed off, on its end facing away from the inlet disk, by way of a lid that has a passage for the spindle, which lid has a contact surface for contact of the spring element. In this way, simplified assembly is achieved.

In a further embodiment of the invention, a hollow-cylindrical segment that aligns with the passage is formed onto the lid. In this way, guidance of the spindle in the head piece is improved. Furthermore, a larger contact surface for accommodation of the spring element is achieved.

In a further development of the invention, the control sleeve has at least one slanted guide edge that lies against a guide slant of the control contour, in such a manner that when the control sleeve is rotated in a defined direction, axial displacement of the control sleeve counter to the bias of the spring element takes place. In this way, an increase in the reset force of the spring is achieved when rotating the spindle and thereby the control sleeve, which force brings about reset of the position of the control sleeve and thereby of the spindle into the "completely closed" starting position, subsequent to activation, after the spindle is let go. In the present case, a "slanted guide edge" is understood to be an edge that has a contact surface, which edge has an incline over its progression, wherein the incline does not have to take place in linear manner. In the following, the term "guide edge" should be equated with the term "guide slant." The different terms are merely chosen for a better assignment to the guide sleeve or control sleeve, respectively.

In a further development of the invention, the control sleeve has at least two slanted guide edges that rise in opposite directions, which edges lie against two guide slants of the guide contour of the guide sleeve that rise in opposite directions, in such a manner that when the control sleeve is rotated in any direction, axial displacement of the control sleeve counter to the bias of the spring element is brought about. In this way, automatic reset of the valve body to the "completely closed" position is brought about from both open positions (for example "cold water only" or "hot water only").

In another embodiment of the invention, the guide contour of the guide sleeve has a level slide surface adjacent to the at least one guide slant. In this way, subsequent automatic reset to the "completely closed" position is achieved when the spindle is rotated in the direction of the guide slant, wherein rotation of the spindle in the opposite direction, in which the control sleeve slides along the level slide surface of the guide sleeve, takes place without automatic reset. In this way, automatic reset of the valve body to the "completely closed" position is made possible, for example, when withdrawing hot water, and setting of a continuous, permanent dispensing amount is made possible with withdrawing cold water. Preferably, the level slide surface is delimited by a stop on one side, which stop interacts with a stop disposed on the control sleeve.

In a further development of the invention, the at least one guide slant of the guide contour of the guide sleeve ends in a notch, into which, in the basic position of the control disk, a projection disposed on its end of the slanted guide edge facing the head piece engages. In this way, mechanical locking of the control sleeve and therefore also of the spindle in the "completely closed" position is achieved.

Figure 2:
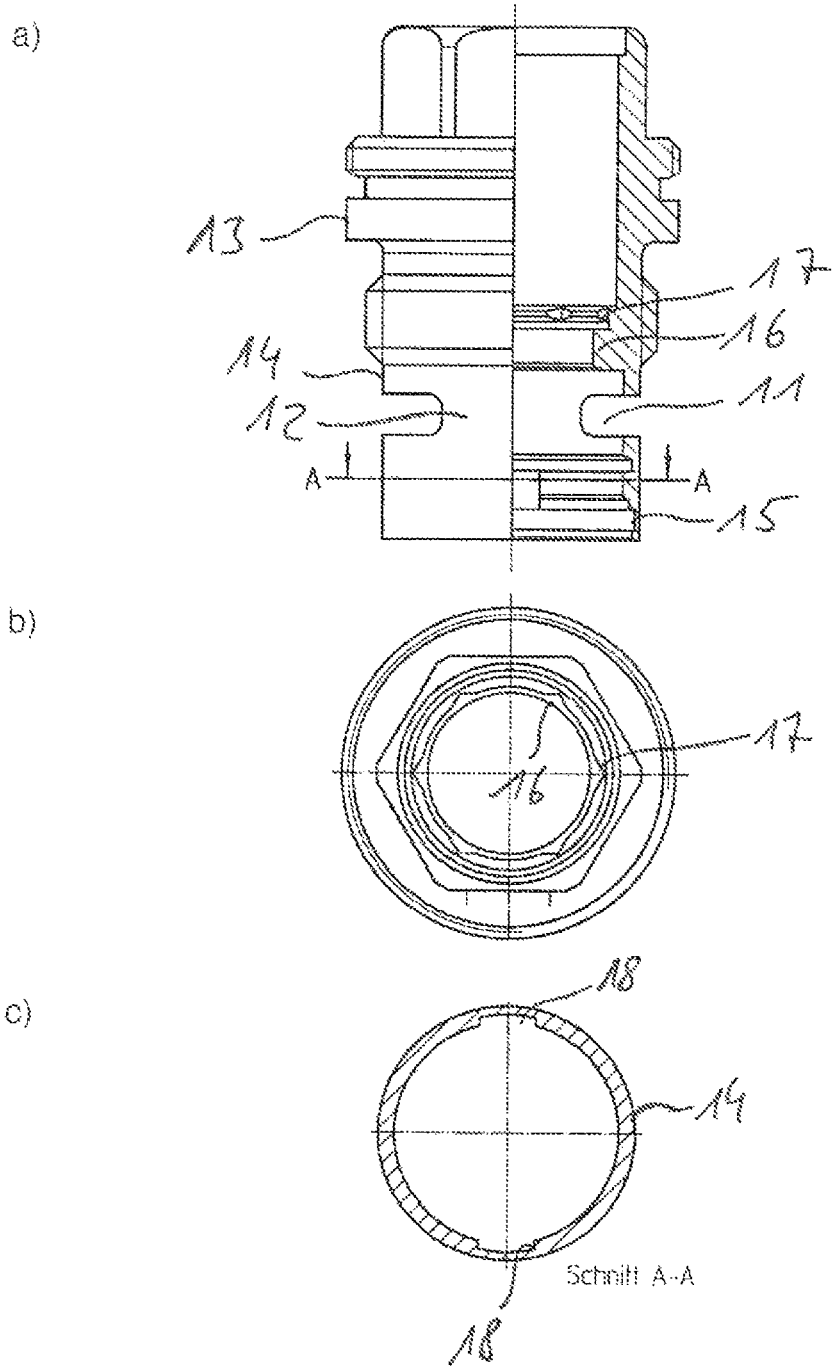
Figure 4:
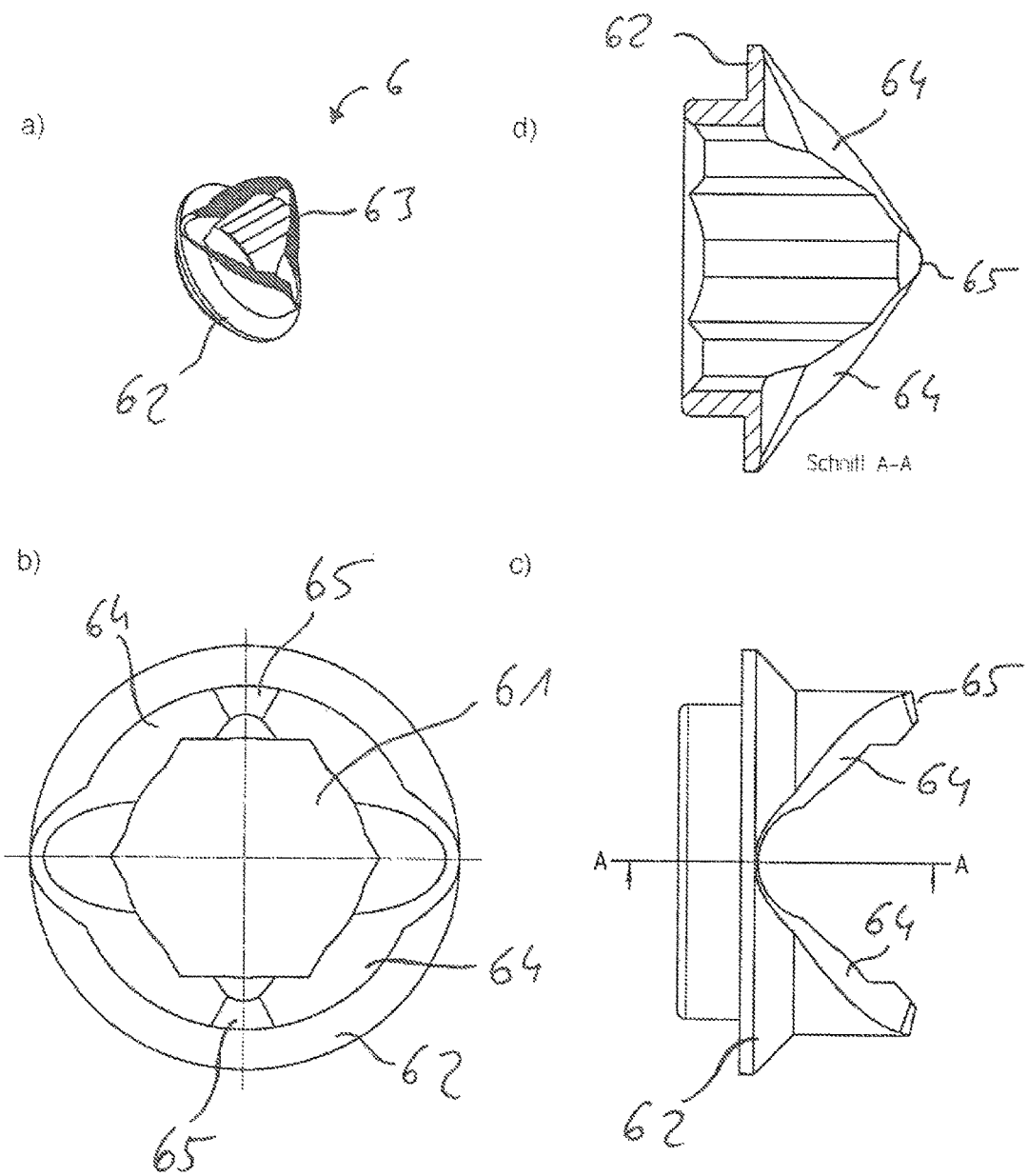
Figure 5:
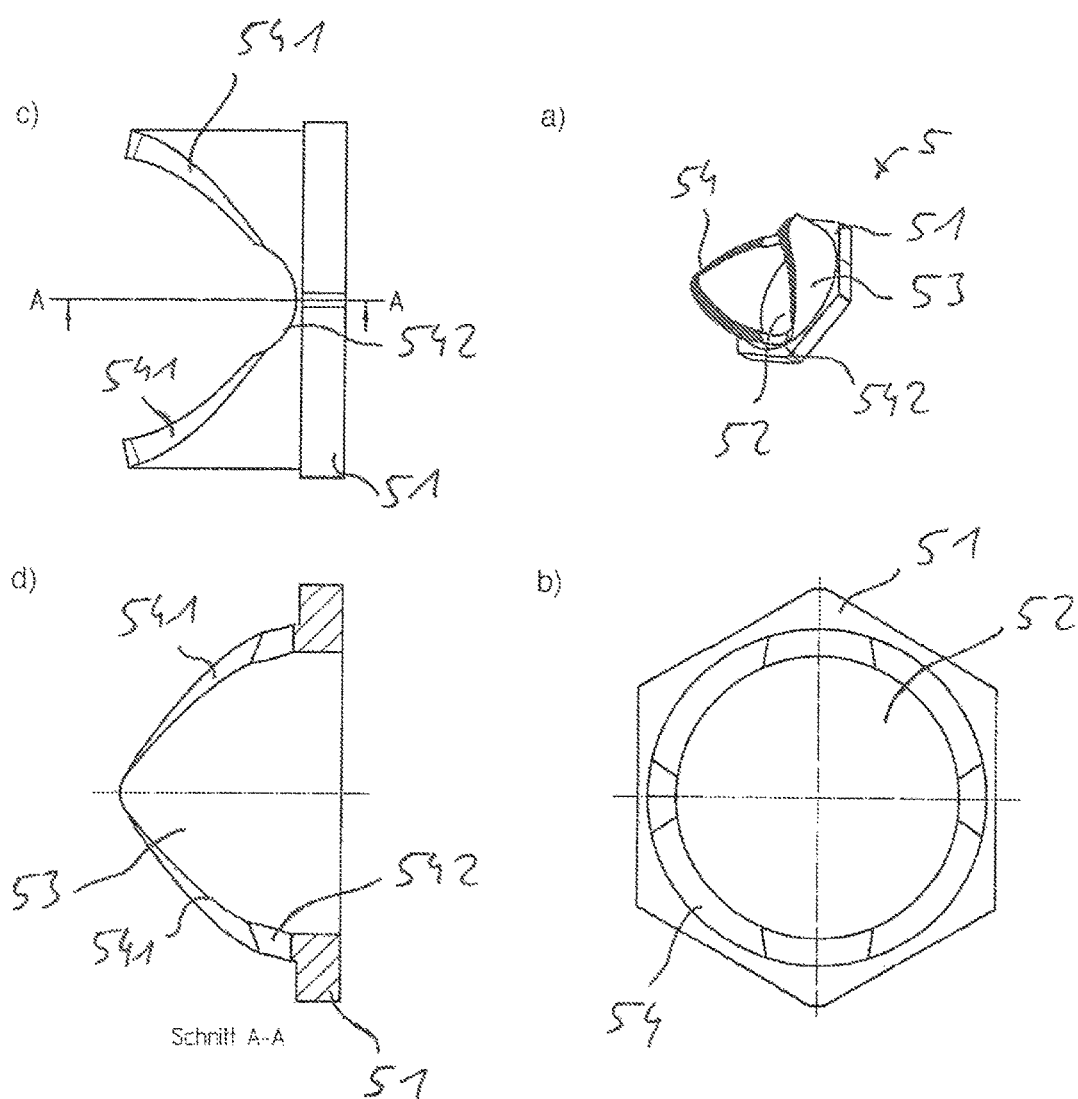
Figure 6:
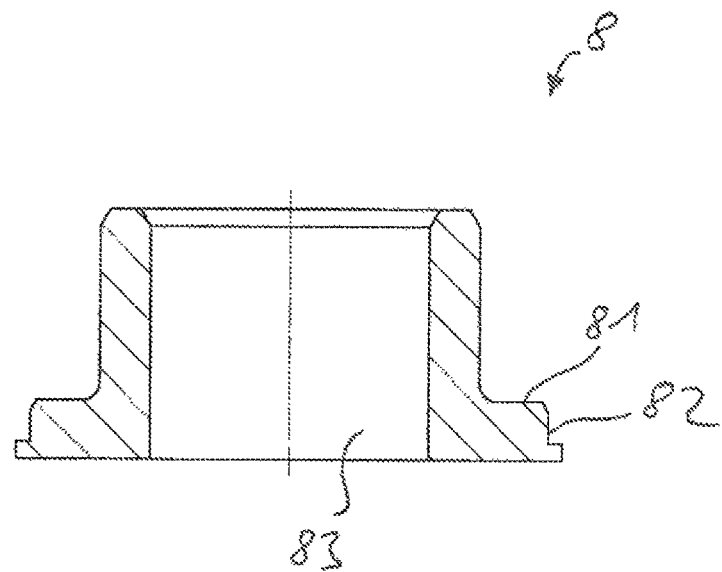
Figure 7:
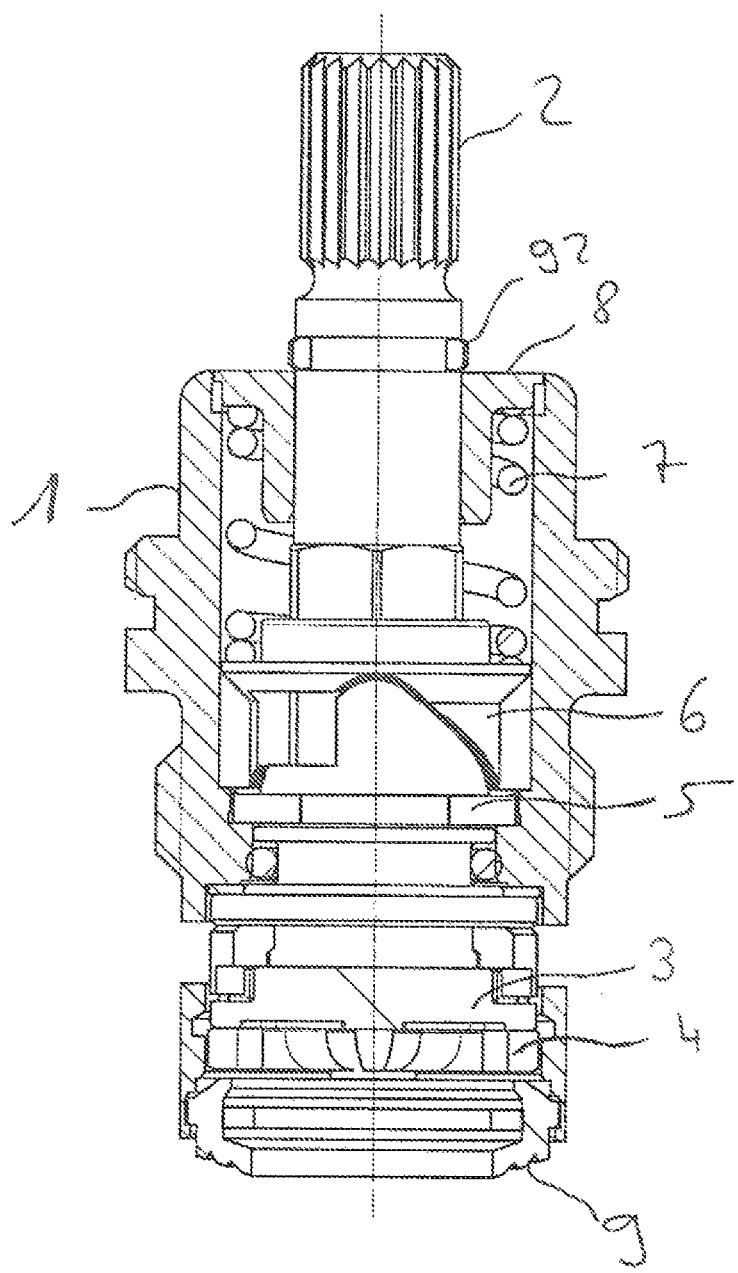
Figure 9:
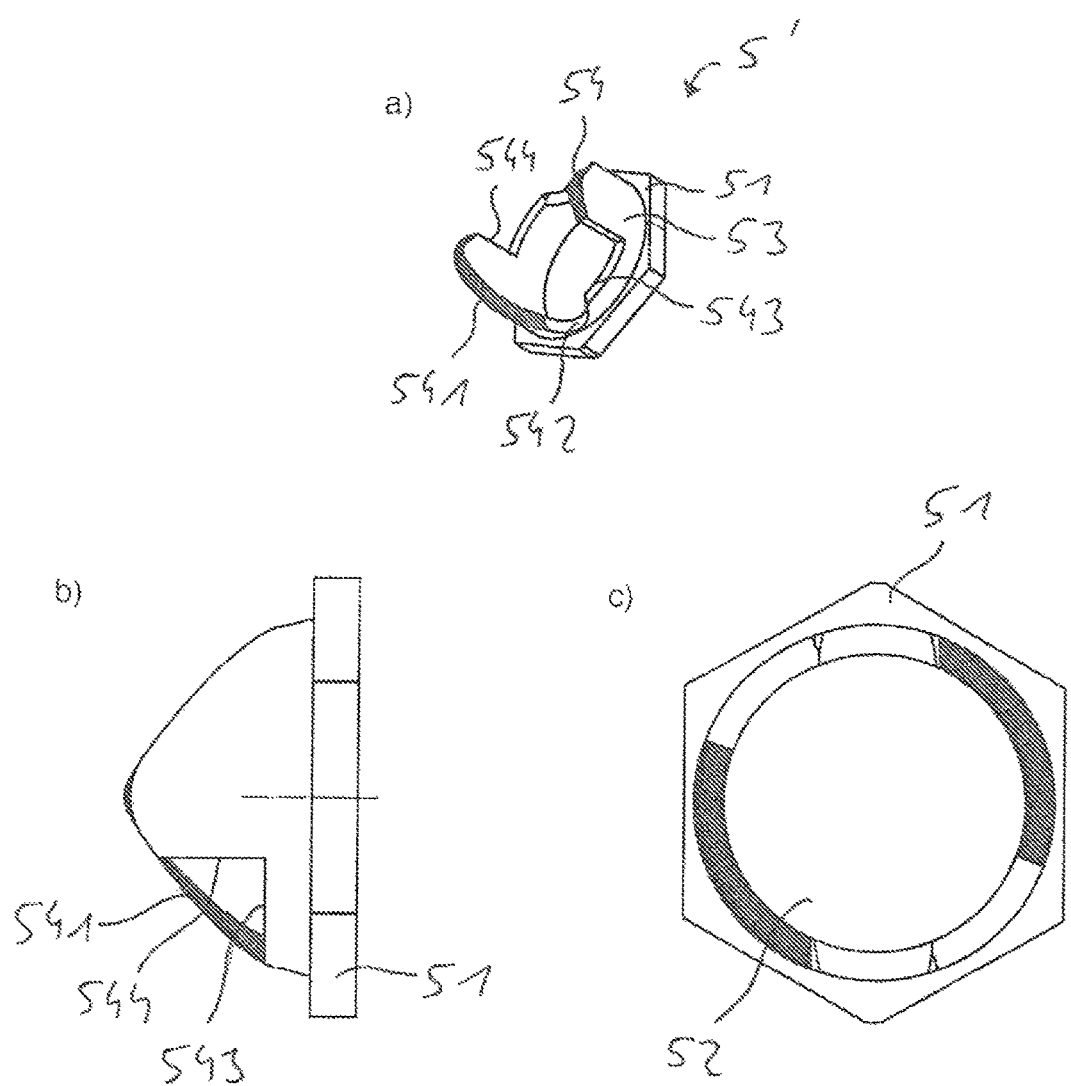

Other further developments and embodiments are indicated in the remaining dependent claims. Exemplary embodiments of the invention are shown in the drawings and will be described in detail below:

FIG. 1 the schematic representation of a valve top in partial section;

FIG. 2 the representation of the head piece of the valve top from FIG. 1
  a) in a side view, in partial section;
  b) in a top view;
  c) in cross-section A-A;

FIG. 3 the representation of the spindle of the valve top from FIG. 1
  a) in a side view;
  b) in section A-A;
  c) in a view from below;

FIG. 4 the representation of the control sleeve of the valve top from FIG. 1
  a) in a spatial representation;
  b) in a top view;
  c) in a side view;
  d) in the longitudinal section A-A;

FIG. 5 the representation of the guide sleeve of the valve top from FIG. 1
  a) in a spatial representation;
  b) in a top view;
  c) in a side view;
  d) in the longitudinal section A-A;

FIG. 6 the representation of the lid of the valve top from FIG. 1 in longitudinal section;

FIG. 7 the schematic representation of a valve top in a further embodiment, in partial section;

FIG. 8 the representation of the control sleeve of the valve top in FIG. 7
  a) in a spatial representation;
  b) in a top view;
  c) in a side view;
  d) in a side view rotated by 90°;

FIG. 9 the representation of the guide sleeve of the valve top in FIG. 7
  a) in a spatial representation;
  b) in a side view, and
  c) in a top view.

The valve top selected as an exemplary embodiment has a head piece 1 through which a spindle 2, radially guided in it, passes in the center. A control disk is connected with the spindle 2 with shape fit and radially guided in the head piece 1. On the side of the control disk 3 that faces away from the spindle 2, an inlet disk is provided in the head piece 1, which disk is followed by a lip seal 9, which comes to lie against the valve seat of a fitting—not shown. Within the head piece 1, a guide sleeve 5 is disposed in torque-proof manner above the control disk 3, followed by a control sleeve 6 that is biased against the guide sleeve 5 by way of a helical spring 7.

The head piece 7 consists of a symmetrical hollow body, the two face surfaces of which are open. On its side facing away from the spindle 2, the head piece 1 has a sleeve-shaped part 14. Passage windows 11 are provided in the sleeve-shaped part 14, which windows are delimited by longitudinal crosspieces 12. In the exemplary embodiment, two windows 11 delimited by longitudinal crosspieces 12 are provided. After introduction of the head piece 1 into a fitting, a collar 13 of the head piece 1 lies on the housing of the fitting. In the sleeve-shaped part 14, on the inside, a relief 15 for accommodation of the lip seal 9 is introduced on the end side. Above the window 11, a circumferential crosspiece 16 that projects radially inward is formed on the inner wall of the head piece 1, followed by a groove 17 having an essentially hexagonal contour. The contour of the groove 17 is achieved by means of introduction of six corners offset from one another by 60 degrees, in each instance, into the inner wall of the head piece 1. On its end opposite the lip seal 9, the head piece 1 is closed off by way of a lid 8.

The spindle 2 is structured to be essentially solid. On its face side that faces away from the water feed line, it is structured as an outer polygon 21 and provided with a dead-end hole 22 having an inside thread, for attachment of a rotary handle. Subsequently, a cylindrical surface 23 is provided on the outside of the spindle 2, followed by a hexagonal segment 24. The hexagonal segment 24 makes a transition into a cylindrical segment 25, on which a crosspiece 251 that projects outward is formed circumferentially. The crosspiece 251 delimits a ring groove 252 for accommodation of an O-ring 91 with a disk 26 formed on the spindle 2, on the end side. The O-ring 91 seals the spindle 2 relative to the head piece 1. In this way, a grease chamber is formed between the lid 8 and the O-ring 91, within the head piece 1. On the end side, the disk 26 is provided with a driver contour 27 for accommodation of the control disk 3.

An insertion 28 for accommodation of a snap ring 92 is introduced into the spindle 2 between the cylindrical surface 23 and the outer polygon 21. The snap ring 92 serves for axial fixation of the spindle 2 in the head piece 1. In this regard, the lid 8 is fixed in place on the head piece 1 by way of the snap ring 92.

The control disk 3 is configured essentially as a circular disk, from which a circular cut 31 has been removed. In the exemplary embodiment, the circular cut 31 has an angle of about 90 degrees. On its side facing the spindle 2, the control disk 3 has an outer contour that corresponds to the driver contour 27 of the spindle 2, thereby connecting control disk 3 and spindle 2 with one another, with shape fit.

The inlet disk 4 is also configured essentially as a circular disk. On its circumference, it has two projections that lie opposite one another—not shown—with which it engages into recesses 18 that are provided in the sleeve-shaped part 14 of the head piece 1 for this purpose. The inlet disk 4 is thereby disposed in the head piece 1 in torque-proof manner. The inlet disk 4 has two passage openings 41 disposed diametrically relative to one another.

The lip seal 9 is inserted into the relief 15 of the head piece 1 and fixed in place by way of a support ring 93 that is introduced. In the assembled state, the lips of the lip seal 9 lie against the inlet disk 4 and against the valve seat of the fitting—not shown—forming a seal.

The guide sleeve 5 essentially consists of a hexagonal disk 51, which is provided with a circular passage 52 in its center. A hollow-cylindrical formed-on part 53 is disposed on the hexagonal disk 51 and provided with a guide contour 54. The guide contour 54 has two guide slants 541 that lie opposite one another, rise in opposite directions, in each instance, and end in a notch 542.

The control sleeve 6 is essentially configured as a hollow cylinder. It has an essentially hexagonal axial passage 61, which corresponds to the hexagonal segment 24 of the spindle 2. The control sleeve 6 has a collar 62 on its outside circumference. Above the collar 62, a control contour 63 is introduced into the control sleeve 6, which contour has two slanted guide edges 64 that rise in opposite directions, in each instance, wherein two guide edges 64, in each instance, form a projection 65 on their maximum facing the guide sleeve 5, which projections correspond with a notch 542 of the guide contour 54 of the guide sleeve 5. The guide edges 64 are configured in such a manner that they interact with the guide slants 541 of the guide contour 54 of the guide sleeve 5 in such a manner that the control sleeve 6 slides along the guide slants 541 of the guide contour 54 with its guide edges 64 during a relative rotation with regard to the guide sleeve 5, which is disposed in the head piece 1 in torque-proof manner, and performs an axial displacement along the spindle 2.

The lid 8 is essentially configured as a hollow cylinder. On its end facing the spindle 2, a circumferential collar 81 is formed on, which serves for contact of the helical spring 7. On the outside, the collar 81 is circumferentially provided with a recess 82 for accommodation of a slide ring 94. The passage 83 of the lid 8 serves to guide both the spindle 2 and the helical spring 7.

In the "completely closed" position, the control sleeve 6 lies against the guide slants 541 of the guide sleeve 5, which is disposed in the head piece 1 in torque-proof manner, with its guide edges 64. In this regard, the hexagonal segment 24 of the spindle 2 passes through the hexagonal passage 61. The helical spring 7 lies on the collar 62 of the control sleeve 6 and is biased between control sleeve 6 and the collar 81 of the lid 8, which is axially held on the spindle 2 by way of the snap ring 92. At the same time, a rotational stop of the spindle 2 is formed by the maximal stroke of the control sleeve. In this regard, either the control sleeve 5 impacts the lid 8 or the spring 7 is moved to the block dimension, thereby also preventing further rotation of the spindle 2. Thus, the maximal angle of rotation of the spindle 2 and thereby the open position of the valve body formed by the control disk 3 and the inlet disk 4 can be adjusted by means of the height of the lid 8 or of the hollow-cylindrical part of the lid 8 that projects into the head piece 1. The same holds true for the dimensioning of the spring 7 in the case of restriction of the angle of rotation of the spindle 2 by way of the block dimension. The block dimension is the dimension of the completely compressed spring element 7.

In the exemplary embodiment according to FIG. 7, the guide contour 54 of the guide sleeve 5 is configured in such a manner that it has a guide slant 541, in each instance, lying opposite one another, followed by a level slide surface 543, in each instance. A notch 542 is disposed, in each instance, between the guide slant 541 and the slide surface 543. The level slide surfaces 543 are delimited by a stop 544, in each instance, which is disposed at the end of the other guide slant 541, in each instance (see FIG. 9).

The sleeve 6 is extensively configured as a mirror image of the guide contour 54 of the guide sleeve 5. A guide edge 64 is disposed, in each instance, lying opposite one another, followed by a level edge 66 that is set back. In this regard, a projection 65 is formed, in each instance, at the maximum of the guide edges 64 that faces the guide sleeve 5, in each instance, which projection corresponds to a notch 542 of the guide contour 54 of the guide sleeve 5 (see FIG. 8). A stop edge 67 follows the projection 65, which edge is aligned essentially orthogonal to the level edge 66 and corresponds to the stop 544 of the guide contour 54 of the guide sleeve 5.

The aforementioned exemplary embodiment shows that the method of functioning of the valve top according to the invention can be changed by means of simple replacement of guide sleeve 5 and control sleeve 6, and adapted to the respective requirements. Of course, embodiments of guide sleeve 5 and control sleeve 6 other than the ones described here as examples are conceivable. Furthermore, a compact construction is achieved by means of the structure of the valve top according to the invention.

Furthermore, it is actually possible to implement a valve top in which only two "stable" states, namely "valve completely open" and "valve completely closed" can be assumed, specifically without any intermediate positions, by means of a specific combination of the depth of the lid 8, on the one hand, and of the configuration of the control sleeve 6 and guide sleeve 5, on the other hand. In this regard, guide sleeve 5 and control sleeve 6 are configured in accordance with FIGS. 4 and 5, wherein the maximal angle of rotation of the spindle 2 is adjusted to be so great that the projection 65 of the control sleeve 6 slides over the highest point of the guide contour 54 of the guide sleeve 5, and afterward, the stable state occurs.

The invention claimed is:

1. Valve top having a head piece, through the center of which a spindle passes, which spindle is mounted in the head piece so as to rotate about the longitudinal axis of the head piece, and by way of which spindle a control disk can be rotated relative to an inlet disk that lies against the control disk, wherein a control sleeve having a control contour and a guide sleeve having a guide contour that lies opposite the control contour are disposed on the spindle, within the head piece, which sleeves interact in such a manner that after activation of the control disk by way of the spindle, in a defined direction, an automatic return movement of the control disk into the starting position of the control disk is brought about,
   wherein the guide sleeve is held in the head piece in torque-proof manner,
   wherein the control sleeve is biased against the guide sleeve by way of a spring element,
   wherein the control sleeve has a radially circumferential contact surface against which the spring element lies.

2. Valve top according to claim 1, wherein the control sleeve has a non-round passage, through which a non-round segment of the spindle that corresponds to the non-round passage passes.

3. Valve top having a head piece, through the center of which a spindle passes, which spindle is mounted in the head piece so as to rotate about the longitudinal axis of the head piece, and by way of which spindle a control disk can be rotated relative to an inlet disk that lies against the control disk, wherein a control sleeve having a control contour and a guide sleeve having a guide contour that lies opposite the control contour are disposed on the spindle, within the head piece, which sleeves interact in such a manner that after activation of the control disk by way of the spindle, in a defined direction, an automatic return movement of the control disk into the starting position of the control disk is brought about,
   wherein the guide sleeve is held in the head piece in torque-proof manner,
   wherein the control sleeve is biased against the guide sleeve by way of a spring element, and
   wherein the head piece is closed off, on the end of the head piece facing away from the inlet disk, by way of a lid that has a passage for the spindle, which lid has a contact surface for contact of the spring element.

4. Valve top according to claim 3, wherein the lid has a hollow-cylindrical segment that aligns with the passage.

5. Valve top having a head piece, through the center of which a spindle passes, which spindle is mounted in the head piece so as to rotate about the longitudinal axis of the head piece, and by way of which spindle a control disk can be rotated relative to an inlet disk that lies against the control disk, wherein a control sleeve having a control contour and a guide sleeve having a guide contour that lies opposite the control contour are disposed on the spindle, within the head piece, which sleeves interact in such a manner that after activation of the control disk by way of the spindle, in a defined direction, an automatic return movement of the control disk into the starting position of the control disk is brought about, wherein the guide sleeve is held in the head piece in torque-proof manner, wherein the control sleeve is biased against the guide sleeve by way of a spring element, and wherein the control sleeve has at least one slanted guide edge that lies against a guide slant of the guide contour of the guide sleeve, in such a manner that when the control sleeve is rotated in a defined direction, axial displacement of the control sleeve counter to the bias of the spring element takes place.

6. Valve top according to claim 5, wherein the control sleeve has at least two slanted guide edges that rise in opposite directions, which edges lie against two guide slants of the guide contour of the guide sleeve that rise in opposite directions, in such a manner that when the control sleeve is rotated in any direction, axial displacement of the control sleeve counter to the bias of the spring element is brought about.

7. Valve top according to claim 5, wherein the guide contour of the guide sleeve has a level slide surface adjacent to the at least one guide slant.

8. Valve top according to claim 7, wherein the level slide surface is delimited by a stop on one side, which stop interacts with a stop disposed on the control sleeve.

9. Valve top according to claim 5, wherein the guide slant of the guide contour of the guide sleeve ends in a notch, into which, in the basic position of the control disk, a projection disposed on its end of the slanted guide edge facing the guide sleeve engages.

* * * * *